Patented Dec. 3, 1935

2,022,678

UNITED STATES PATENT OFFICE 2,022,678

PROCESS FOR RENDERING WATER-SOLUBLE COMPOUNDS SOLUBLE IN ORGANIC SOLVENTS AND SUBSTANTIALLY WATER INSOLUBLE AND PRODUCT OF SUCH PROCESS

Wolf Kritchevsky, Carl J. Beckert, and Jack Braver, Chicago, Ill.

No Drawing. Application August 18, 1930, Serial No. 476,234

44 Claims. (Cl. 260—1)

Our invention relates to the dye industry, and has to do more particularly with processes for producing new and improved dyestuffs, and also includes the products resulting from such processes.

It has for its principal object the production of a large class of dyes soluble in organic solvents.

Another object is to change the solubility characteristics of an organic substance so that instead of being soluble in water and insoluble in organic solvents, the substance will be insoluble in water and soluble in organic solvents.

Another object is to modify water soluble dyes to render the same soluble in organic solvents.

We have found that we are able to take any water soluble dye having one or more sulfonic acid groups, or one or more carboxylic groups, or one or more hydroxy groups having an acid reaction, and modify the characteristics of such dye to render the same soluble in organic solvents. We have found that compounds of the same general character having no color can also be treated by our process to render the same soluble in organic solvents.

In general, our invention consists in modifying the character of certain free groups attached to the dye molecule, it having been discovered by us that if the solubility characteristics of these free groups is modified, the solubility of the entire molecule will be modified. In general, it may be said that our result is accomplished by attaching thereto, preferably by a linkage which will be described, certain radicals which will have an effect upon the solubility of the dye molecule as a whole, but which will not adversely affect the action of the dye itself or modify its valuable characteristics as a dye in any respect. This general statement of the manner in which our invention is accomplished is developed fully in the following description. In order that those skilled in the art may understand our invention and the manner in which it is practiced, we shall describe not only the specific manner in which the invention may be carried out, but the principal steps through which the invention was developed. It is understood however, that this description is for the purpose of explanation only, and shall not be effective as a limitation of the scope of the invention as defined by the claims.

It has been a matter of common knowledge for some considerable time that when an acid dye, soluble in water, and having one or more sulfonic acid groups, or one or more carboxyl groups, is treated with a basic dye, the mixture will form a precipitated dyestuff which is water insoluble and also, unfortunately, substantially insoluble in any other solvent known. In other words, the resulting product is in reality, a pigment. The formation of this pigment has been explained by the union between the amino group or amino derivatives of the amino group of the basic dye, and the acidic group of an acid dye to form an insoluble nucleus according to the following formula:

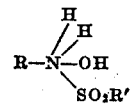

In this formula R and "R'" are the dye molecules, and it will be noted that the nitrogen becomes pentavalent.

This compound can also be shown as follows:

We have found that an analogous reaction takes place when any other organic bases such as aniline, toluidine, or similar amines are added to an acid dyestuff, an organic pigment being formed which is water insoluble but also for the most part insoluble in organic solvents. We learned also that by substituting an alkyl amine for the aryl amines just mentioned, that the same reaction results, but that the dye or pigment obtained is both water soluble and soluble in organic solvents.

Proceeding with our development from this point, we substituted di amines for the mono amines and found that we obtained a dye substance having modified solubility characteristics. For example, when using paraphenylene diamine with a dye containing one sulfonic acid group, one mol of paraphenylene diamine and one mol of the dye, the pigment obtained was insoluble in water but was soluble in dilute acids like hydrochloric acid, for example. We explain this solubility by the formation of the hydrochloride on the second amino group. By substituting paraamido phenol for the paraphenylene diamine in the same reaction, we obtained a dye which was insoluble in water and also insoluble in dilute acids. This dye, on the other hand, is soluble in dilute alkalis and we assume that this is probably due to the formation of the alkali salt on the free hydroxy group.

We applied the same reactions to the aliphatic amines, like ethanol amine and ethylene diamine, and obtained reaction products that are water soluble, but we found that these products were also soluble in some organic solvents.

From the observed facts, and additional experimental facts and theories, we developed a hypothesis, the accuracy of which has been proven by experiment. By means of a process based upon this hypothesis we are enabled to render a water soluble dye soluble in substantially any type of solvent desired.

Proceeding from the point where the treatment of acid dyes with certain amines has a marked effect upon the solubility of the dye, it appeared to us that the treatment of the dye with an amine or amino compound of a suitable type could be made to affect the solubility in any desired or desirable manner. We demonstrated to ourselves that if the dye was treated with an amine having a reactive group in addition to the amino group, the character of this reactive group (which we call the first reactive group) would be effective to modify the solubility of the dye. We found in addition that we could treat the amine, (either a primary, secondary, or tertiary amine), by esterification of the first reactive group or other ways, to attach a second reactive group to the first reactive group of the amine.

This modified amine can then be combined with the acid dye, and the resulting complex will have modified solubility characteristics imparted thereto by the presence of the second reactive group. In other words, if we should take a hydroxy or amino group or any other "reactive group", and instead of combining it with an acid or alkali as in paraphenylene diamine or para-amido phenol, we should esterify it with certain organic radicals, the whole complex will be influenced by the attached radical and cause the complex to dissolve in solvents kindred to that particular radical.

Explaining the phenomenon more specifically, by substituting the hydroxy or amino group with lower fatty acids, we can get solubility in acetone, alcohols, organic solvents and esters. By attaching higher fatty acids such as stearic acid, etc., to the reactive groups, we can cause the complex to become soluble in hydrocarbon solvents. If an aromatic substitution product is employed, we can cause the complex to become soluble in aromatic solvents. And so, for example, by substituting the reactive group with abietic acid, we can cause the complex to become soluble in turpentine and other hydro-aromatic solvents.

We have checked our hypothesis by experiment and find that it holds true invariably, as far as our investigation has carried us over several years time. Since there are very many thousands of compounds which would have to be enumerated to cover all possible combinations, we do not find it advisable or necessary to list all of these compounds in order to make the details of the invention clear to those skilled in the art. In order that we might prove our hypothesis without possibility of error, we have done most of our work with a single type of compound, using as the second reactive group acyl groups combined with the first reactive group of the amine. We shall, therefore, describe our present invention as applied particularly to acyl substitution products of the reactive groups.

The final product of our invention is a chemical, the molecule of which has been modified to consist of three major components which are as follows:

A. The acidic complex (the dye—or similar chemical compound).

B. The basic complex. This comprises
(1) The amine containing the first reactive group.
(2) The second reactive group, or as here explained, the acyl group.

In order to clarify the invention, these components will be discussed separately.

The dyes with which our invention can be practiced are the so-called acid dyes, and we include by the term "dye" as here used, any dye having one or more sulfonic acid groups, one or more carboxylic group, or one or more acid hydroxy group, like eosin, reduced vat dyes, or mixtures thereof. Dyes of any class will respond to this reaction such as nitro, mono and polyazo, pyrazolon, anthraquinone, azine, xanthon, and chrom dyes, vat dyes, or in general, any dyes possessing an acidic salt forming group.

As previously suggested, the amine containing a reactive group may be a primary, secondary, or tertiary amine. The reactive groups forming part of the amine may be hydroxy, amino, SH, $PH_2$, etc.; the amino group may be attached directly to the first reactive group, or may be linked through an intermediary like oxygen, sulfur, nitrogen, $CH_2-$, $-CH_2-O-CH_2-C_2H_4-$, $CH_2-S-CH_2-$, and their homologues and substitution products, $-CH_2-C_6H_4CH_2-$, $-C_6H_4-$, $-C_6H_4-C_6H_4-$, $-C_6H_4-CH_2-C_6H_4-$, $-C_6H_4-O-C_6H_4-$, and their substitution products, multiples thereof and variations thereof. The same applies to the naphthyl residue, etc. In other words, the amine can be expressed in the following general formula:

$$Y-X_{n-1}-NR_2$$

in which "Y" would be the first reactive group as previously mentioned and described, "X" the connecting link between the "reactive group" and the amine "$n$" any whole number, as 1, 2, etc., "N" for nitrogen, and "R" for hydrogen, or an organic substitution thereof which will leave the basic complex basic enough to combine with acidic chemicals. Chemicals of this kind comprise hydroxylamine, hydrazine, ethanol amines, ethylene diamines, ureas, urethanes, thio ureas, thio diamines, aminophenols, phenylene diamines, diphenyl derivatives of amino naphthols, naphthaline diamines, phenyl naphthylamines, amido hydroxy and diamino diphenyl oxides, sulphides, benzylamines, etc. The "X" therefore may be an organic hydrocarbon radical or a substitution product thereof, as for example when one H of the hydrocarbon radical is replaced by a halogen, etc. The term "organic hydrocarbon radical", therefore, as used in the claims, is intended to include derivatives of an organic hydrocarbon radical.

In order to clarify our statement, as to how we can express various compounds by means of this formula, we shall cite examples:

1. If Y is a hydroxy group, $n$ equals 1, thereby $n-1$ equals zero, and R represents hydrogen, then the product that it would represent would be hydroxylamino $HO-NH_2$.

2. If on the other hand Y represents OH, X represents $C_2H_4$, $n$ equals 2, and R represents hydrogen, then the formula would express mono-ethanolamine $NH_2C_2H_4-OH$.

3. Again, if, in the same formula, one of the R's represents hydrogen, and the other R represents $CH_2-CH_2-OH$, then the formula would express diethanolamine.

4. If on the other hand, both R's should be $CH_2$—$CH_2$—OH, then the formula would represent triethanolamine.

5. If, on the other hand, Y represents hydroxy group, X represents $C_6H_4$, and the R's denote hydrogen, the formula would express para-amino phenol, etc.

6. If Y denotes an amino group, and the rest of the symbols as noted in the first example, the formula would express hydrazine, $NH_2$—$NH_2$.

7. If Y denotes an amino group, then Example 2 would denote ethylene diamine, $$NH_2CH_2—CH_2NH_2,$$

and Example 5 would denote paraphenylene diamine.

We believe we have illustrated in the above examples exactly what we contemplate by the expression "amine having a reactive group".

The second reactive group is attached to the first reactive group of the amine to produce a substituted reactive group which, when the amine is combined with the dye, will lend its solubility properties to the dye molecule as a whole, including the added amine. As previously set forth, the present application is explained with acyl groups substituted in place of the first reactive group of the amine, thus producing an acyl substituted reactive group. Under AC. group we include acidic groupings like H—CO which is the residue of formic acid
$CH_3$—CO which is the residue of acetic acid
$CH_3$—$CH_2$—CO which is the residue of propionic acid
$C_{11}H_{23}$—CO which is the residue of lauric acid
$C_{17}H_{35}$—CO which is the residue of stearic acid
$C_{18}H_{32}$—CO which is the residue of linoleic acid
$C_6H_5$—CO which is the residue of benzoic acid
$C_{10}H_7$—CO which is the residue of naphthoic acid
$CH_3C_6H_4SO_2$—which is the residue of aryl sulfonic acid
$C_{19}H_{29}$—CO which is the residue of abietic acid, and their substitution products, or any other group having an organic radical attached to the acidic group.

From what has been previously said, our acyl substituted amine (the basic complex) is a product of the general formula:

$$Ac—Y—X_{n-1}—NR_2$$

This is the formula previously described in connection with the amine containing a reactive group to which has been added the acyl radical "Ac" which may be any radical such as those set forth in the preceding paragraph. This formula exactly represents the substance which will be combined with the dye to produce a resulting dye product having modified solubility characteristics. This is the basic complex, which combines with the acid complex (the dye) to produce the final product of our invention.

Considering the above general formula in connection with Example 2 listed above, if this compound is combined with the acetyl radical shown under the list of examples of acyl groups, the formula will express acetyl-mono-ethanolamine, $CH_3CO$—O—$CH_2CH_2$—$NH_2$. In case the stearyl group radical is substituted for the first reactive group in Example 4 above, then the product will be mono-stearyl-tri-ethanolamine,

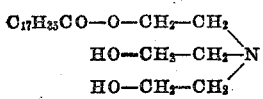

In Example 5, if the acyl should be a benzoyl group, then the compound would be benzoyl-amino phenol, $C_6H_5$—CO—O—$C_6H_4$—$NH_2$.

In our development work we have found it more economical and advantageous first to prepare the amine with the substituted reactive group (second reactive group) and then to combine the resulting compound with the dye. Equally good results however, have been obtained by first treating the dye with the amine having a reactive group, thereby producing a soluble or insoluble derivative thereof; and subsequently treating the resulting derivative to substitute the second reactive group which we have described as preferably an acyl group.

In order to illustrate our invention and certain ways in which it may be practiced, we shall give several examples. It is obvious that these are meant to be merely illustrative, as the technique may be varied and the compounds employed may run into several thousand.

The following examples relate to the use of the invention with a dye with which we are primarily interested. In each of the examples given we have first prepared the substituted amine with the second reactive group and then treated the dye with the amine, to produce the new dye product having modified solubility characteristics. The substituted amines shown are first produced by suitable means which will be readily within the knowledge of the skilled dye chemist.

*Example 1.*—One molecular quantity of Naphthol Yellow S, C. I. No. 10, S. J. No. 7, is dissolved in water and a solution of oleyl-mono-ethanolamine hydrochloride is added until all of the dye is precipitated. The precipitate is filtered, washed and dried. It is soluble in benzol, acetone, alcohol, and mineral naphtha.

*Example 2.*—One molecular quantity of Alizarin Yellow R, C. L. 40, S. J. 58, is precipitated with a solution of benzoyl-para-amino phenol hydrochloride. The dye obtained is soluble in alcohol and acetone.

*Example 3.*—Erioflavin 3GNP which is made from diazotized-1-p-chloranilin and coupled with p-sulphonyl-3-methyl 15-pyrazalon, is precipitated with a solution of abietyl ethylene diamine. The resulting product is soluble in hydrocarbon and lacquer solvents.

*Example 4.*—One mol of Eriochromrot PE, C. I. 652, is precipitated with a solution of stearyl tri-ethanolamine acetate. The dye is soluble in hydrocarbon solvents.

*Example 5.*—One mol of Lake Red C, C. I. 165, S. J. 153, is precipitated with a solution of linoleyl para-phenylene diamine. The resulting product is soluble in organic solvents.

*Example 6.*—One mol of Alizarin Blue Sap, C. I. 1054, S. J. 858, is precipitated with an acid solution of stearyl mono-ethanol-amine. The dye is soluble in hydrocarbon solvents, acetone, etc.

*Example 7.*—One mol of Acid Anthraquinon Green, C. I. 1078, S. J. 858, is precipitated with a dilute acid solution of linoleyl-tri-ethanolamine. The dye is soluble in hydrocarbon solvents.

*Example 8.*—One mol of Newport Light Fast Wool Red BL is precipitated with a dilute solution of para-toluol sulpho-ethanolamine. The resulting product is soluble in organic solvents.

*Example 9.*—Oleyl benzidine hydrochloride is added in solution to a solution of Rhodamine B, C. I. 749, S. J. 573, and the resulting precipitate is filtered and dried. It is soluble in various organic solvents.

*Example 10.*—One mol of Anthrene Jade Green,

C. I. 1101 is reduced with sodium hydrosulphite in strongly alkaline solution until the reduction product is completely soluble. This reduction product is added slowly with stirring to a molecular quantity of monopalmityl tri-ethanol amine dissolved in dilute acetic acid. The precipitated product resulting from the union is filtered off or previously reoxidized and then filtered off and dried. It is soluble in solvent naphtha and gasoline, and many other organic solvents.

The above are merely selected examples of a large number of dyes and dye compounds with which we have experimented, and are believed to be sufficient, when taken with the preceding description, to enable any skilled chemist to obtain our results.

The examples given immediately above of the production of the final modified solubility product, all make use of the so-called "wet process" in which solutions of the dye in water are first formed, and the process carried out in such solution to form a water insoluble precipitate. We may also carry out our process in other ways, either effecting a combining of the substances in a dry state, or with suitable organic solvents. In other words, our process includes any means for reacting the basic complex, which is the intermediate substitution product, and the acid complex, which may be a dye.

For example, we mix molecular portions of stearyl mono-ethanol amine (see Example 6 above) with alizarin blue, both in a dry state, and grind them together until a homogeneous mixture is obtained. This mixture is soluble in organic solvents like solvent naphtha, etc.

In some cases it may be necessary to add a little solvent naphtha or other organic solvent to thin out the reaction products, as the reaction product may be too dry and the reaction will not be complete.

In connection with the previously given example 7, we may first make the basic complex by heating together molecular quantities of linoleic acid and tri-ethanol amine until the reaction product is completely soluble in dilute acid. When this action is complete, linoleyl tri-ethanol amine is formed and this is mixed with a molecular quantity of acid anthraquinon green (C. I. 1078, S. J. 858) in the presence of a small amount of an organic solvent. The reaction takes place with or without heating, until the product is soluble in solvent naphtha.

As a matter of fact, while in this invention we are primarily concerned in having the dye as the first component, this reaction is also capable of combining with chemicals of the organic field that have groups lending acidic characteristics, such as carboxy or sulfonic groups, and which chemicals are colorless, as for instance intermediates such as naphthalene sulfonic acid which is soluble in water and insoluble in organic solvents. On the other hand, when such are treated with our second component, they become soluble in organic solvents and substantially insoluble in water. These compounds will be colorless, but can be used for intermediates in dyes, or in medicinals, or in plastics, etc. Thus, 1 mol of R salt, which is 3,6 disulfonic acid of beta naphthol is precipitated with a dilute solution of a little over two mols of stearyl tri-ethanolamine. This compound becomes insoluble in water, but soluble in hydrocarbon solvents.

Our invention relates to the process for producing improved dye products and similar products which are found to be modifications of similar products heretofore known. The final results of our processes can be represented by the following formula:

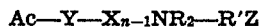

$$Ac-Y-X_{n-1}NR_2-R'Z$$

In this formula the symbol R' is employed to indicate the dye molecule and Z represents either a sulfonic acid radical or a carboxylic or hydroxy group or any other acid group. It is obvious that when the invention is practiced with colorless compounds but having the general dye structure and capable of being treated in the same manner, the letter R' will also represent the molecule of such product.

The great advantages to be derived from our invention will at once be apparent to those skilled in dye chemistry and arts in which dyes are used. It is obvious that we are able to make use of any of the well known commercial dyes of commerce of known fastness to light, and modify such dyes to make them soluble in suitable organic solvents such as most oils of commerce without in any way impairing their value as dyes. This renders these well known dyes available for uses to which they could not have been put heretofore. In the plastic industries, in lacquers, rubber, "Bakelite" products, in the dyeing of leather, in paints, and in many other places, our new dye products are very valuable.

One use to which the product of our invention can be applied is in the coloring of such commodities as gasoline. Dyes can be made available for use in gasoline in exceedingly small proportions but sufficient to tint the gasoline a striking, readily distinguishable color. This can be used for distinguishing between different grades of gasoline manufactured by the same company and also for the purpose of distinguishing the gasoline of the different companies. Our invention includes, therefore, not only the dry product produced in accordance with our invention, but solutions thereof in organic solvents such as described.

Throughout the application, we have discussed the first and second reactive groups, as if only one of such groups could be represented in the molecule. Those skilled in organic chemistry will readily understand, however, that more than one group can exist, particularly groups of the character referred to as first reactive groups. Considering the basic complex di-amino phenol, we could substitute the hydrogen of the hydroxy group, and one or both of the hydrogens of one of the amino groups, with for example, stearic acid, which would result in a basic complex of stearyl-oxy-stearyl amino-aminobenzol. This basic complex would combine with an organic chemical or dye having an acidic group, to form a composition of matter soluble in an organic solvent.

Possibly the following formula could be given to express the final dye complex when a basic complex of this character is employed

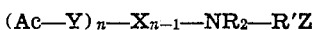

$$(Ac-Y)_n-X_{n-1}-NR_2-R'Z$$

in which $n$ is a small whole number. As the details of the invention should be clear from the description and main formula given, it appears to us that to attempt to express the above situation in the formula would merely complicate matters, without adding to the disclosure. Our main formula can, in most instances, be used to cover the same compounds as the formula given immediately above, as the second (Ac—Y) can be considered as a part of the X.

We have given many details and explanations of features of our invention to enable those skilled in the art to practice the same, but it is obvious that the invention is not necessarily limited to the details and explanations given. For example, in the formula for the final dye complex as used throughout the specification and claims, we have indicated that the final product is an addition product. While we assume from our study of the matter that we have in fact a substitution product, it may in fact be a condensation product, for example. Whatever the character of the compound, however, the formula is meant to express the product resulting from our process, and having the novel characteristics described. For the reasons stated, the invention is limited only by the scope of the appended claims, due regard being given to the above explanation.

What we claim as new and desire to protect by Letters Patent of the United States is:—

1. A process for rendering a water soluble dye containing an acidic group, soluble in an organic solvent, which comprises combining said dye with a chemical compound having the general formula

in which "Ac" is an acyl group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, and R represents hydrogen or an alkyl group which may be substituted by a hydroxy or alkoxy radical.

2. A process for rendering a water soluble dye containing an acidic group, soluble in an organic solvent, which comprises combining said dye with a chemical compound having the general formula

in which "Ac" is a higher fatty acid soap-forming radical linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, and R represents hydrogen or an alkyl group which may be substituted by a hydroxy or alkoxy radical.

3. A process for rendering a water soluble dye containing an acidic group, soluble in an organic solvent, which comprises combining said dye with a chemical compound having the general formula

in which "Ac" is a stearic acid radical linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, and R represents hydrogen or an alkyl group which may be substituted by a hydroxy or alkoxy radical.

4. A process for rendering a water soluble dye containing an acidic group, soluble in an organic solvent, which comprises combining said dye with a chemical compound having the general formula

in which "Ac" is a linoleic acid radical linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, and R represents hydrogen or an alkyl group which may be substituted by a hydroxy or alkoxy radical.

5. A process for rendering a water soluble dye containing an acidic group, soluble in an organic solvent, which comprises combining said dye with a chemical compound having the general formula

in which "Ac" is an oleic acid radical linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, R represents hydrogen or an alkyl group which may be substituted by a hydroxy or alkoxy radical.

6. A process for rendering a water soluble dye containing an acidic group, soluble in an organic solvent, which comprises combining said dye with a chemical compound having the general formula

in which "Ac" is an acyl group linked to Y, "Y" is nitrogen, X is a hydrocarbon radical which may be substituted by a hydroxy or alkoxy radical forming the chemical linkage between "Y" and "N", "n" is a whole number, and R represents hydrogen or an alkyl group which may be substituted by a hydroxy or alkoxy radical.

7. A process for rendering a water soluble dye containing an acidic group, soluble in an organic solvent, which comprises combining said dye with a chemical compound having the general formula

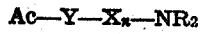

in which "Ac" is an acyl group attached to Y by esterification, "Y" is oxygen, X is a hydrocarbon radical which may be substituted by a hydroxy or alkoxy radical forming the chemical linkage between "Y" and "N", "n" is a whole number, and "R" represents hydrogen or an alkyl group which may be substituted by a hydroxy or alkoxy radical.

8. A process for rendering a water soluble dye containing an acidic group, soluble in an organic solvent, which comprises combining said dye with a chemical compound having the general formula

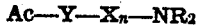

in which "Ac" is an acyl group linked to Y, "Y" is a non-metal of a group consisting of oxygen, nitrogen, sulphur, phosphorus and iodine, X is an aliphatic hydrocarbon radical which may be substituted by a hydroxy or alkoxy radical forming the chemical linkage between "Y" and "N", "n" is a whole number, and "R" represents hydrogen or an alkyl group which may be substituted by a hydroxy or alkoxy radical.

9. A process for rendering a water soluble dye containing an acidic group, soluble in an organic solvent, which comprises combining said dye with a chemical compound having the general formula

in which "Ac" is an acidic group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, and "R" represents hydrogen or an alkyl group which may be substituted by a hydroxy or alkoxy radical.

10. A process for rendering a water soluble dye containing an acidic group, soluble in an organic solvent, which comprises combining said dye with a chemical compound having the general formula

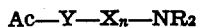

in which "Ac" is an acidic group linked to Y, "Y" is a non-metal of a group consisting of oxygen, nitrogen, sulphur, phosphorus and iodine, "X" represents CH$_2$ or its homologues, "$n$" is a whole number, and "R" represents hydrogen or an alkyl group which may be substituted by a hydroxy or alkoxy radical.

11. A process for rendering a water soluble dye containing an acidic group, soluble in an organic solvent, which comprises combining said dye with a chemical compound having the general formula

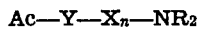

in which "Ac" is an acidic group linked to Y, "Y" is a non-metal of a group consisting of oxygen, nitrogen, sulphur, phosphorus, and iodine, "X" represents C$_2$H$_4$, "$n$" is a whole number, and "R" represents hydrogen or an alkyl group which may be substituted by a hydroxy or alkoxy radical.

12. An improved dye compound soluble in an organic solvent and comprising a modified water soluble dye of a type containing an acidic group, said dye compound having the general formula

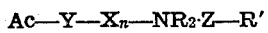

in which "Ac" is an acidic group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "$n$" is a whole number, "R" represents hydrogen or an alkyl group which may be substituted by a hydroxy or alkoxy radical, "R'" represents the nucleus of a dye molecule ordinarily soluble in water, and "Z" is a group normally a part of the water soluble dye nucleus R' and lending acidic characteristics thereto.

13. An improved dye compound soluble in an organic solvent and comprising a modified water soluble dye of a type containing an acidic group, said dye compound having the general formula

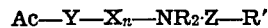

in which "Ac" is a higher fatty acid soap-forming radical linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "$n$" is a whole number, "R" represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

14. An improved dye compound soluble in an organic solvent and comprising a modified water soluble dye of a type containing an acidic group, said dye compound having the general formula

in which "Ac" is an oleic acid group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "$n$" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

15. An improved dye compound soluble in an organic solvent and comprising a modified water soluble dye of a type containing an acidic group, said dye compound having the general formula

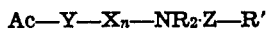

in which "Ac" is a linoleic group, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "$n$" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

16. An improved dye compound soluble in an organic solvent and comprising a modified water soluble dye of a type containing an acidic group, said dye compound having the general formula

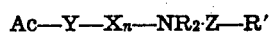

in which "Ac" is an acidic group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "$n$" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

17. An improved dye compound soluble in an organic solvent and comprising a modified water soluble dye of a type containing an acidic group, said dye compound having the general formula

in which "Ac" is an acyl group linked to Y, "Y" is a non-metal of a group consisting of oxygen, nitrogen, sulphur, phosphorus, and iodine, X is an aliphatic hydrocarbon radical which may be substituted by a hydroxy or alkoxy radical forming the chemical linkage between Y and N, "$n$" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

18. An improved dye compound soluble in an organic solvent and comprising a modified water soluble dye of a type containing an acidic group, said dye compound having the general formula

in which "Ac" is an acyl group linked to Y, "Y"

is a non-metal of a group consisting of oxygen, nitrogen, sulphur, phosphorus, and iodine, "X" represents CH₂ or its homologues and forms a chemical linkage between Y and N, "n" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

19. An improved dye compound soluble in an organic solvent and comprising a modified water soluble dye of a type containing an acidic group, said dye compound having the general formula

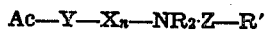

in which "Ac" is an acyl group linked to Y, "Y" is a non-metal of a group consisting of oxygen, nitrogen, sulphur, phosphorus, and iodine, "X" represents C₂H₄, "n" is a whole number, R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

20. An improved dye compound soluble in an organic solvent and comprising a modified water soluble dye of a type containing an acidic group, said dye compound having the general formula Ac—Y—X$_n$—NR₂·Z—R' in which "Ac" is an acyl group linked to Y, "Y" represents nitrogen, X is a hydrocarbon radical which may be substituted by a hydroxy or alkoxy radical forming the chemical linkage between "Y" and "N", R represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

21. An improved dye compound soluble in an organic solvent and comprising a modified water soluble dye of a type containing an acidic group, said dye compound having the general formula

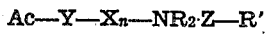

in which "Ac" is an acyl group attached to Y by esterification, "Y" represents oxygen, X is a hydrocarbon radical which may be substituted by a hydroxy or alkoxy radical forming the chemical linkage between "Y" and "N", "n" is a whole number, R represents hydrogen or an alkyl group which may be substituted by a hydroxy or alkoxy radical, "R'" represents the nucleus of a dye molecule ordinarily solvent in water, and "Z" is a group normally forming a part of the water soluble dye nucleus R' and lending acidic characteristics thereto.

22. An improved dye compound soluble in an organic solvent and comprising a modified water soluble dye of a type containing an acidic group, said dye compound having the general formula Ac—Y—X$_n$—NR₂·Z—R' in which "Ac" is an acyl group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, R represents hydrogen or an alkyl group which may be substituted by a hydroxy or alkoxy radical, "R'" represents the nucleus of a dye molecule ordinarily soluble in water, and "Z" represents a carboxyl group.

23. An improved dye compound soluble in an organic solvent and comprising a modified water soluble dye of a type containing an acidic group, said dye compound having the general formula

in which "Ac" is an acyl group linked to Y, "Y" is a non-metal of a group consisting of oxygen, nitrogen, sulphur, phosphorus, and iodine, X is a hydrocarbon radical which may be substituted by a hydroxy or alkoxy radical forming the chemical linkage between "Y" and "N", "n" is a whole number, R represents hydrogen or an alkyl group which may be substituted by a hydroxy or alkoxy radical, "R'" represents the nucleus of a dye molecule ordinarily soluble in water, and "Z" represents a sulfonic acid group.

24. An improved dye compound soluble in an organic solvent and comprising a modified water soluble dye of a type containing an acidic group, said dye compound having the general formula

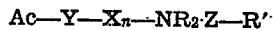

in which "Ac" is an acyl group linked to Y, "Y" is a non-metal of a group consisting of oxygen, nitrogen, sulphur, phosphorus and iodine, X is a hydrocarbon radical which may be substituted by a hydroxy or alkoxy radical forming the chemical linkage between "Y" and "N", "n" is a whole number, R represents hydrogen or an alkyl group which may be substituted by a hydroxy or alkoxy radical, "R'" represents the nucleus of a dye molecule ordinarily soluble in water, and "Z" represents a hydroxy group.

25. A method of rendering a water soluble dye of an acidic nature soluble in an organic solvent, which comprises chemically reacting said dye with a tri-ethanol amine, in which the "H" of one of the "OH" groups is substituted by an acyl group.

26. A method of rendering a water soluble dye of an acidic nature soluble in an organic solvent, which comprises chemically reacting said dye with a tri-ethanol amine, in which the "H" of one of the "OH" groups is substituted by a higher fatty acid group.

27. A method of rendering a water soluble dye of an acidic nature soluble in an organic solvent, which comprises chemically reacting said dye with a tri-ethanol amine, in which the "H" of one of the "OH" groups is substituted by a ricinoleyl group.

28. A new dye compound with modified solubility characteristics, said compound resulting from a chemical reaction between a dye having an acidic group and a derivative of tri-ethanolamine, and having the general formula

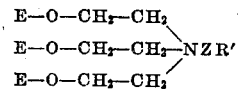

in which at least one of the "E's" represents an organic acidic group capable of modifying the solubility characteristics of the product, the other "E's" represent hydrogen or an organic acidic group, "R'" represents the nucleus of the dye molecule normally soluble in water, and "Z" is a group lending acidic characteristics to "R'".

29. A new dye compound with modified solubility characteristics, said compound resulting from a chemical reaction between a dye having an acidic group and a derivative of tri-ethanolamine, and having the general formula

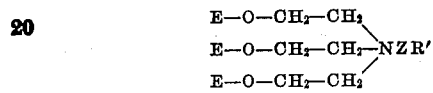

in which at least one "E" represents an acyl group and the other "E's" represent an acyl group or hydrogen, "R'" represents the nucleus of the dye molecule normally soluble in water, and "Z" is a group lending acidic characteristics to "R'".

30. A new dye compound with modified solubility characteristics, said compound resulting from a chemical reaction between a dye having an acidic group and a derivative of tri-ethanolamine, and having the general formula

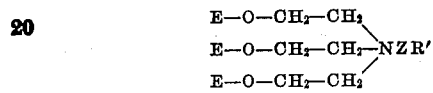

in which at least one "E" represents a higher fatty acid group and the other "E's" represent either higher fatty acid group or hydrogen, "R'" represents the nucleus of the dye molecule normally soluble in water, and "Z" is a group lending acidic characteristics to "R'".

31. A new dye compound with modified solubility characteristics, said compound resulting from a chemical reaction between a dye having an acidic group and a derivative of tri-ethanolamine, and having the general formula

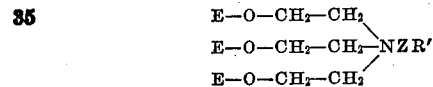

in which at least one of the "E's" represents a linoleyl group and the other "E's" represent either a linoleyl group or hydrogen, "R'" represents the nucleus of the dye molecule normally soluble in water, and "Z" is a group lending acidic characteristics to "R'".

32. A new dye compound with modified solubility characteristics, said compound resulting from a chemical reaction between a dye having an acidic group and a derivative of tri-ethanolamine, and having the general formula

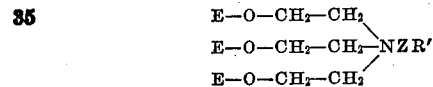

in which at least one of the "E's" represents a stearyl group and the other "E's" represent either a stearyl group or hydrogen, "R'" represents the nucleus of the dye molecule normally soluble in water and "Z" is a group lending acidic characteristics to "R'".

33. A new dye compound with modified solubility characteristics, said compound resulting from a chemical reaction between a dye having an acidic group and a derivative of tri-ethanolamine, and having the general formula

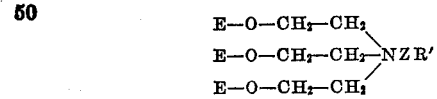

in which at least one of the "E's" represents a recinoleyl group and the other "E's" represent either a recinoleyl group or hydrogen, "R'" represents the nucleus of the dye molecule normally soluble in water, and "Z" is a group lending acidic characteristics to "R'".

34. Method of rendering a water soluble dye having an acidic group soluble in an organic solvent which comprises combining said dye with an amine represented by the formula

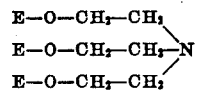

in which at least one of the "E's" represents a higher fatty acid group and the other "E's" represent either a higher fatty acid group or hydrogen, "R'" represents the nucleus of the dye molecule normally soluble in water, and "Z" is a group lending acidic characteristics to "R'".

35. Method of rendering a water soluble dye having an acidic group soluble in an organic solvent which comprises combining said dye with an amine represented by the formula

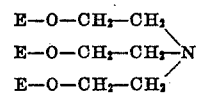

in which at least one of the "E's" represents a stearyl group and the other "E's" represent either a stearyl group or hydrogen, "R'" represents the nucleus of the dye molecule normally soluble in water, and "Z" is a group lending acidic characteristics to "R'".

36. Method of rendering a water soluble dye having an acidic group soluble in an organic solvent which comprises combining said dye with an amine represented by the formula

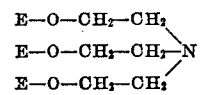

in which at least one of the "E's" represents a linoleyl group and the other "E's" represent either a linoleyl group or hydrogen, "R'" represents the nucleus of the dye molecule normally soluble in water, and "Z" is a group lending acidic characteristics to "R'".

37. The method of rendering a water soluble dye of an acidic character soluble in an organic solvent which comprises chemically reacting said dye with an alkylol amine, wherein the hydroxy radical of the alkylol group has its hydrogen replaced by an acyl group.

38. The method of rendering a water soluble dye of an acidic nature soluble in an organic solvent, which comprises chemically reacting said dye with an alkylol amine, wherein at least one hydrogen of one alcoholic hydroxy group is replaced by an acyl group.

39. A process for rendering a water soluble dye containing an acidic group soluble in an organic solvent which comprises combining said dye with a chemical compound having the general formula $$Ac—Y—X_n—NR_2$$

in which "Ac" is an acyl group linked to Y, "Y" is a non-metal of a group consisting of oxygen, nitrogen, sulphur, phosphorus, and iodine, "X" is a hydrocarbon which may be substituted by a hydroxy or alkoxy radical forming the chemical linkage between Y and N, "n" is a whole number, and "R" represents hydrogen, $Ac—Y—X_n—$, or an alkyl group which may be substituted by a hydroxy or alkoxy radical.

40. An improved dye compound soluble in an organic solvent and comprising a modified water soluble dye of a type containing an acidic group, said dye compound having the general formula $$Ac\text{—}Y\text{—}X_n\text{—}NR_2.Z\text{—}R'$$

in which "Ac" is an acidic group linked to "Y", "Y" is a non-metal of a group consisting of oxygen, nitrogen, sulphur, phosphorus, and iodine, "X" is a hydrocarbon radical which may be substituted by a hydroxy or alkoxy radical forming the chemical linkage between "Y" and "N", "$n$" is a whole number, "R" represents hydrogen, $Ac\text{—}Y\text{—}X_n\text{—}$, or an alkyl group which may be substituted by a hydroxy or alkoxy radical, "R'" represents the nucleus of a dye molecule ordinarily soluble in water, and "Z" is a group normally a part of the water soluble dye nucleus R' and lending acidic characteristics thereto.

41. A process for rendering a water soluble dye containing an acidic group, soluble in an organic solvent, which comprises combining said dye with a chemical compound having the general formula $$Ac\text{—}Y\text{—}X_n\text{—}NR_2$$

in which "Ac" is an acidic group linked to Y, "Y" is a non-metal of a group consisting of oxygen, nitrogen, sulphur, phosphorus and iodine, "X" is —$C_6H_4$—, "$n$" is a whole number, and "R" represents hydrogen or an alkyl group which may be substituted by a hydroxy or alkoxy radical.

42. An improved dye compound soluble in an organic solvent and comprising a modified water soluble dye of a type containing an acidic group, said dye compound having the general formula $$Ac\text{—}Y\text{—}X_n\text{—}NR_2\cdot Z\text{—}R'$$

in which "Ac" is an acidic group linked to Y, "Y" is a non-metal of a group consisting of oxygen, nitrogen, sulphur, phosphorus, and iodine, "X" is —$C_6H_4$—, "$n$" is a whole number, "R" represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

43. A process for rendering a water soluble dye containing an acidic group, soluble in an organic solvent, which comprises combining said dye with a chemical compound having the general formula $$Ac\text{—}Y\text{—}X_{n-1}\text{—}NR_2$$

in which "Ac" is an acidic group linked to Y, "Y" is a non-metal of a group consisting of oxygen, nitrogen, sulphur, phosphorus, and iodine, "X" is a hydrocarbon radical which may be substituted by a hydroxy or alkoxy radical forming the chemical linkage between Y and N, "$n$" is a whole number, and "R" represents hydrogen or an alkyl group which may be substituted by a hydroxy or alkoxy radical.

44. An improved dye compound soluble in an organic solvent and comprising a modified water soluble dye of a type containing an acidic group, said dye compound having the general formula $$Ac\text{—}Y\text{—}X_{n-1}\text{—}NR_2.Z\text{—}R'$$

in which "Ac" is an acidic group linked to Y, "Y" is a non-metal of a group consisting of oxygen, nitrogen, sulphur, phosphorus, and iodine, "X" is a hydrocarbon radical which may be substituted by a hydroxy or alkoxy radical forming the chemical linkage between Y and N, "$n$" is a whole number, "R" represents hydrogen or an alkyl group which may be substituted by a hydroxy or alkoxy radical, "R'" represents the nucleus of a dye molecule ordinarily soluble in water, and "Z" is a group normally forming a part of the water soluble dye nucleus R' and lending acidic characteristics thereto.

WOLF KRITCHEVSKY.
CARL J. BECKERT.
JACK BRAVER.